(No Model.)

I. C. TERRY.
Car-Truck.

No. 228,694.  Patented June 8, 1880.

ATTEST:
Geo. H. Knight
Walter Allen

INVENTOR:
Ira C. Terry
By Knight Bros.
Attys

United States Patent Office.

IRA C. TERRY, OF ST. LOUIS, MISSOURI.

CAR-TRUCK.

SPECIFICATION forming part of Letters Patent No. 228,694, dated June 8, 1880.

Application filed March 27, 1880. (No model.)

*To all whom it may concern:*

Be it known that I, IRA C. TERRY, residing at the city of St. Louis, in the State of Missouri, have invented Improvements in Truck Attachments for Railway-Cars, of which the following is a specification.

My invention relates to means for the support of a car-body at one or more points between the usual end trucks.

My invention consists in combining with a railway-car one or more intermediate or supplemental trucks, each pivoted to a suitable bolster provided with wheels running against a rail or rails fixed transversely beneath the car-body, so as to permit free lateral motion of the supplemental truck or trucks relatively to the car-body, as hereinafter described.

Figure 1:
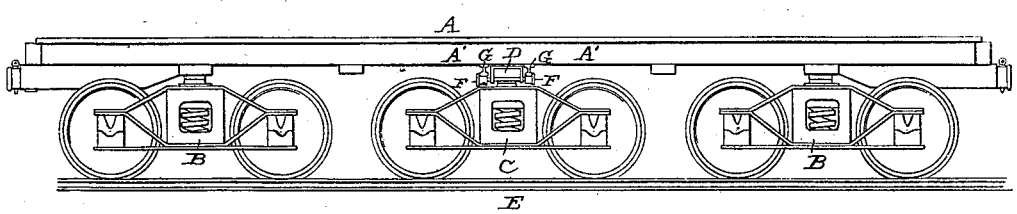
Figure 2:
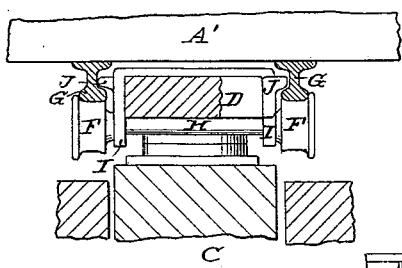
Figure 3:
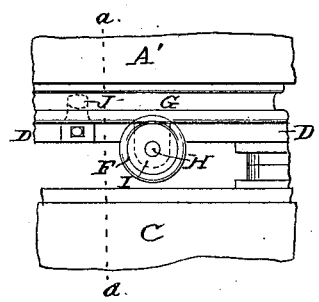
Figure 4:
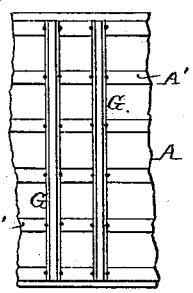

In the drawings, Figure 1 is a side view of a car with my improvement applied thereto. Fig. 2 is part in section at *a a* and part an end view of the bolster. Fig. 3 is a detail elevation. Fig. 4 is a bottom view of a portion of the car-bottom, showing the rails attached thereto.

A is the car-body. B B are trucks attached to the car near its ends, as usual, and possessing no novel feature. C is a truck connected to a piece of timber, D, by a king-bolt connection, in the usual way of connecting a truck to a car, so as to allow the truck to turn relatively to the car according to the requirements of the truck E.

The bar or bolster D is not fast to the car-body, as usual, but has capacity for lateral movement beneath the car-body, to allow the truck a lateral movement when the car is running over curves on the track.

To give to the bolster D ease of movement beneath the car it has attached to it wheels or rollers F, which run beneath rails G, attached transversely to the bottom of the car-body.

The rails G may be lengths of ordinary T-rails, as shown, or may be of any other suitable formation. They may be spiked or bolted to the sills A' in any suitable manner.

As a way of attaching the wheels F to the bolster D, I place the wheels both upon one axle-bar H, to which they may be both firmly attached without affecting their operation, as they will always turn equally, even if loose upon the axle. The axle passes beneath or through the bolster D, and through bearings at the ends of a bar, I, which is bent over the bolster D, and extends down both sides of the same.

The wheels are shown with a flange like an ordinary car-wheel bearing against the outside of the rail; but the wheels may be double flanged, or may be merely concave faced.

J J are lugs or cleats attached to the sides of bolster D and bearing upon the upper side of the head of the rail, so as to prevent the rail from jumping from the wheel.

It is obvious that the same end might be accomplished by attaching the rails to the truck and the wheels to the car-body.

I do not confine myself to the mechanical construction shown for accomplishing the result claimed; but

I claim as new and of my invention—

In a railway-car, one or more supplemental trucks interposed between the end trucks and having pivotal connection to a bolster, D, in combination with wheels F and rail or rails G, upon the bolster and car-body, respectively, to permit free lateral motion of the supplemental truck or trucks, as explained.

IRA C. TERRY.

Witnesses:
SAML. KNIGHT,
GEO. H. KNIGHT.